United States Patent
Kullberg et al.

[15] 3,653,727
[45] Apr. 4, 1972

[54] BRAKE CONTROL SYSTEM FOR WHEELED VEHICLES

[72] Inventors: Otto Gosta Kullberg, Smedsbacksgatan 11, Stockholm; Olle Nordstrom, Enbacksvagen 13, Vallentuna, both of Sweden

[22] Filed: Sept. 22, 1969

[21] Appl. No.: 859,734

[30] Foreign Application Priority Data

Oct. 22, 1968 Sweden..............................14286/68

[52] U.S. Cl. ............................303/21 P, 188/181 R, 303/20
[51] Int. Cl...........................................B60t 8/10, B60t 8/12
[58] Field of Search............188/181 R, 181 A, 181 C, 181 T; 303/21 A, 21 BB, 21 P, 21 BE, 21 EB, 21 B, 21 C, 21 CF, 21 CG, 21 F, 20; 317/5; 318/52; 324/161; 340/52, 263

[56] References Cited

UNITED STATES PATENTS

| | | | |
|---|---|---|---|
| 3,245,213 | 4/1966 | Thompson et al. | 303/21 EB |
| 3,398,994 | 8/1968 | Smith | 303/21 P |
| 3,498,682 | 3/1970 | Mueller et al. | 303/21 BE |
| 3,499,689 | 3/1970 | Carp et al. | 303/21 P |
| 3,503,654 | 3/1970 | Stamm | 303/21 EB |

Primary Examiner—Milton Buchler
Assistant Examiner—Stephen G. Kunin
Attorney—Fred C. Philpitt

[57] ABSTRACT

A brake control system for wheeled vehicles which includes transmitters located at each braked wheel of the vehicle, each of the transmitters generating an electrical signal corresponding to the rotary speed of the respective wheel. A reference speed generator is provided to produce a reference speed signal which is actuated by the output from at least one of the transmitters. Apparatus are provided to neutralize or reduce the braking power, temporarily supplied to the wheel, which provides an input for the reference speed generator, during the period it provides such an input. Associated with each of the wheels are calculating devices to determine the slip, defined as the quotient of the difference between the actual speed of the wheel and the reference speed divided by the reference speed. In addition, for each wheel apparatus are provided to determine the deceleration of that wheel. A control device compares the slip and deceleration for each of the wheels and, if necessary reduces the braking power supplied to that wheel. In the disclosed embodiment the reference speed is determined alternately from one of the two rear wheels. The wheel from which the reference speed signal is derived is, during the time the reference speed signal is derived, unbraked.

4 Claims, 1 Drawing Figure

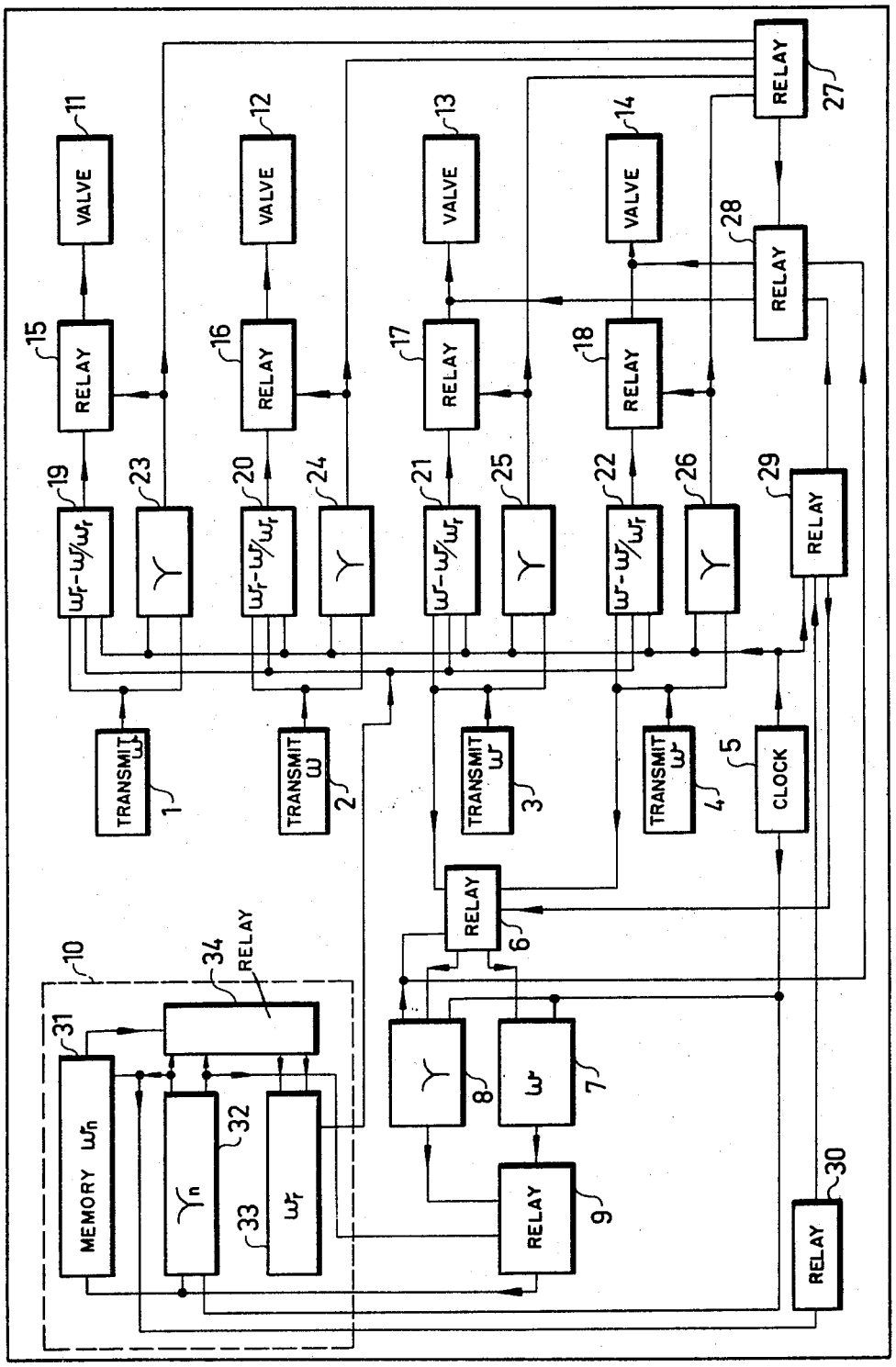

BRAKE CONTROL SYSTEM FOR WHEELED VEHICLES

In recent years many different means have been proposed for controlling the braking power in automobiles and other wheeled vehicles. These known means have had for their purpose to reduce the risk that the vehicle will upon a strong application of the brakes lose its steering function due to locking of the wheels. Most of the known devices are based on the principle of controlling the braking power only in dependence on the angular deceleration of the braked wheels of the vehicle. In order to afford a reliable function said known controlling means require braking systems having a quick response. However, such systems can be very difficult to obtain in practice. Another type of known controlling means is based on the principle of controlling the braking power in dependence of a comparison between the rotary speed of the respective braked wheel and the rotary speed of a freely rotating wheel. Previously it has been assumed that this method requires either that the reference wheel is completely unbraked or, if braking of said wheel is permitted, that the braking power acting on said wheel is considerably reduced as compared to the braking power on the other wheels. Under certain circumstances both alternatives may be disadvantageous, on the one hand, due to a certain reduction of the braking capacity and a corresponding increase of the braking distance and, on the other, due to the fact that the reduced or eliminated braking function of one wheel may influence the steering function of the vehicle.

The present invention has for its object to provide a brake control system which eliminates the above mentioned drawbacks of the prior art devices.

The invention relates to a brake control system for wheeled vehicles comprising a transmitter at each braked wheel of the vehicle, said transmitters being adapted to generate electric signals corresponding to the rotary speed of the respective wheel, means for comparing said signals with a reference speed signal and producing signals representing the slip of the wheels, means controlled by the last mentioned signals and adapted to control the braking power on the respective wheel, and a reference speed generator serving to produce said reference speed signal and arranged to be actuated by the output signal from at least one of said transmitters.

The brake control system of the invention is primarily characterized in that the reference speed generator is controlled by means intermittently sensing the rotary speed $w_n$ and simultaneously determining the deceleration $r_n$ of one of the wheels, means being provided to neutralize or reduce the braking power temporarily on said wheel so that in the sensing moment $t_n$ it will rotate with a speed corresponding to the speed of a freely rotating wheel, said means for controlling the reference speed generator being arranged to cause a successive intermittent adjustment of the reference speed signal which represents a reference speed $w_r=w_n-r_n(t-t_n)$.

In a preferred embodiment of the invention the reference speed signal is derived from the speed and deceleration of two or more wheels alternately serving as a reference wheel.

The correction of the reference speed signal can according to the invention preferably be made either with constant time intervals or with time intervals having a length determined by the deceleration of the reference wheel.

The invention will now be described in greater detail, reference being had to the accompanying drawing showing, by way of example, a block diagram of a brake control system according to one embodiment of the invention.

In the drawing reference numerals 1, 2, 3 and 4 designate four transmitters provided each at one wheel of a vehicle, for instance an automobile, and adapted to produce a number of pulses per time unit proportional to the rotary speed of the respective wheel. Reference numeral 5 designates a clock pulse generator producing an output signal having the shape of a pulse train of constant pulse frequency and serving as a time reference. In the embodiment shown in the drawing the two transmitters 1 and 2 are assumed to be provided one at each front wheel of the vehicle and the two transmitters 3 and 4 at the rear wheels of the vehicle. The output signals from transmitters 3 and 4 are fed to a relay 6 adapted to pass the output signal alternately from transmitter 3 and from transmitter 4 to two calculating units 7 and 8 both supplied also with the output signal from the clock pulse generator 5. The calculating unit 7 is arranged to determine continuously the instantaneous speed of the wheel having its transmitter 3 or 4, respectively, connected to said unit, while unit 8 calculates the instantaneous deceleration of said wheel. Provided that the deceleration calculated in unit 8 falls below a certain predetermined value said unit will supply relay 6 with a control signal breaking the connection between the transmitter 3 or 4, respectively, and the calculating units 7 and 8. Said signal is also fed as a control signal to a relay 9 which upon activation thereof connects the output from unit 7 to an input of a reference speed generator 10 also supplied with the output signal from the clock pulse generator 5. The reference generator 10, which will be described more in detail below, serves to generate a reference speed signal $w_r$ following the equation $w_r=w_n-r_n(t-t_n)$, where $w_n$ represents the instantaneous rotary speed calculated in unit 7 and $r_n$ is the deceleration value calculated in generator 10, while $t$ designates the time and $t_n$ the moment of sensing the rotary speed $w_n$.

In the pressure line to the braking cylinder of each wheel of the vehicle, which has been assumed to have an hydraulic braking system, there is provided a magnetic valve 11, 12, 13 and 14, respectively. Each such valve is controlled by means of a relay 15, 16, 17 and 18, respectively, which when operative closes the appurtenant valve, thereby cutting off the supply of pressure medium to the respective wheel and releasing said wheel. The relays 15, 16, 17 and 18 are each adapted to be operated by the output signals, on the one hand, from one unit 19, 20, 21 and 22, respectively, for calculating the slip of the respective wheel, and on the other hand from one unit 23, 24, 25 and 26, respectively, for calculating the acceleration or deceleration, respectively, of said wheel. Units 19, 20, 21 and 22 are designed so as to calculate the slip of the respective wheel as the quotient between, on the one hand, the difference between the reference speed and the wheel speed and, on the other hand, the reference speed. Each such unit is supplied with the output signal from the corresponding transmitter 1, 2, 3 or 4, respectively, and with the output signal from the clock pulse generator 5, and also with the output signal from the reference speed generator 10, while the calculating units 23, 24, 25 and 26, respectively, are supplied with the output signal from the transmitter 1, 2, 3 or 4 of the respective wheel and with the output signal from the clock pulse generator 5. The output signals from units 23, 24, 25 and 26 serve to control the operation levels of relays 15, 16, 17 and 18. Said levels are influenced by the output signals from units 23, 24, 25 and 26 in such a way that high deceleration values make the relays operative for low slip values, while high acceleration values permit the relays to become inoperative also for high slip values.

Reference numeral 27 designates a relay supplied with the output signals from all units 23, 24, 25 and 26 for calculating the wheel acceleration and deceleration, respectively. Relay 27 controls a further relay 28 and is arranged to cause relay 28 to activate alternately the one and the other of the two magnetic valves 13 and 14 at the rear wheels as soon as the deceleration of any wheel of the vehicle exceeds a predetermined value. The shifting of relay 28 will be synchronized with the shifting of relay 6 so that the rear wheel having its transmitter 3 or 4 controlling the reference speed signal generation will be unbraked. The relays 6 and 28 may be arranged to shift either at constant time intervals under the control of the clock pulse generator 5, or at variable time intervals. In the latter case the shifting operation is controlled in dependence of the magnitude of the deceleration calculated in the reference speed generator so that high deceleration values will involve short time intervals and conversely. Reference numeral 29 designates a relay fed with the output signal from the clock pulse generator 5 and with a signal from a relay 30 controlled by the reference speed generator 10. Relay 29 will deliver the required control pulses to relays 6 and 28 to cause the desired shifting of said relays.

The reference speed generator 10 comprises a memory 31 and a unit 32 for calculating the deceleration, both being, at the intermittent operation of relay 9, supplied from unit 7 with a signal representing the rotary speed of a rear wheel calculated in said unit. Generator 10 comprises also a unit 33 in which the reference speed signal is produced as the difference between, on the one hand, the speed value stored in memory 31 and, on the other hand, the product of the deceleration value calculated in unit 32 and the time. The output signal from unit 33 is changed from the value $w_r = w_n - r_n(t-t_n)$ to the new value $w_r = w_{n+1} - r_{n+1}(t-t_{n+1})$ as soon as unit 32 has determined the mean deceleration value, corresponding to the quotient between the speed difference $w_{n+1} - w_n$ and the time interval $t_{n+1} - t_n$. If the two values $r_n$ and $r_{n+1}$ are different from each other the output signal $w_r$ from unit 33 will be suddenly changed at the time $t_{n+1}$. The deceleration calculating unit 32 must contain a memory in which the speed value $w_n$ can be stored until the deceleration $r_{n+1}$ corresponding to quotient $(w_{n+1}aIw_n)/(t_{n+1}-t_n)$ has been calculated in said unit. Generator 10 further comprises a relay 34 controlled from the calculating unit 32 and adapted to deliver new values of $w_n$, $r_n$ and $t_n$ to unit 33 as soon as the deceleration calculation in unit 32 has been completed.

The control signal from unit 32 to relay 34 is also fed to relay 9 and causes said relay to become inoperative whereby said relay is brought into a ready state for the next transmission of information from the calculating unit 7 to the reference speed generator 10.

Below the function of the above described arrangement will be explained in greater detail.

Assuming that the braking system of the vehicle is unactuated, then the relay 6 will work continuously and connect alternately pulse transmitter 3 and pulse transmitter 4 to the two calculating units 7 and 8. As long as the deceleration calculated in unit 8 is lower than the predetermined limit value relay 9 is intermittently operated and the reference speed generator 10 is successively adjusted. At this stage relays 15, 16, 17 and 18 are, however, inoperative as any output signal from the calculating units 19, 20, 21 and 22 cannot be produced when the vehicle is unbraked. Thus the valves 11, 12, 13 and 14 are open.

When the brake system of the vehicle is actuated the deceleration calculated in unit 8 will increase. As long as said deceleration is below the predetermined limit value the relay 9 will continue to become intermittently activated and transmit the speed values calculated in unit 7 to the reference speed generator 10, the output signal of which will be adjusted in response to said values and the time intervals between the transmission thereof. Upon each activation of relay 9 the shifting relay 6 will be blocked of the control signal from unit 8 so that further calculation in units 7 and 8 is temporarily interrupted. After a short time interval the relay 6 is again activated by a signal from relay 29 and the transmitter 3 or 4 is connected to the calculating units 7 and 8. As mentioned above relay 6 is activated either at constant time intervals or in dependence of the deceleration value calculated in unit 32. In the latter case relay 6 is activated by a signal from relay 30 to relay 29.

Reference speed generator 10 produces an intermittently corrected reference speed signal which is fed to the different calculating units 19–26. Said units will supply relays 15–18 with signals corresponding to the speed and deceleration of the different wheels. Depending on the magnitude of said signals one ore more of said relays may be activated whereby the magnetic valve 11, 12, 13 or 14, respectively, operated by the relay in question is closed and the braking pressure on the corresponding wheel brake is neutralized. If the wheel deceleration calculated in any of units 23–26 exceeds the predetermined value relay 27 will become operative and activate relay 28. Relay 27 should be adjusted so as to activate relay 28 at a deceleration level equal to or lower than the level at which unit 8 causes blocking of relay 6.

In addition to the control signal to relay 6 relay 29 also delivers a control signal to relay 28 which, if simultaneously actuated from relay 27, generates a command signal to valve 13 or 14 so that the rear wheel controlling the speed and deceleration calculation in units 7 and 8 will become unbraked. As long as the deceleration calculated in unit 8 is lower than the predetermined value the process above described will be repeated cyclically and the output signal from reference speed generator 10 will be successively adjusted to new values. The control signal delivered from unit 8 to relay 6 for blocking said relay is also supplied to relay 28 so that the command signal to valves 13 or 14, respectively, is interrupted. The purpose of this measure is to prevent the two rear wheels, alternately functioning as a reference wheel, from being unbraked during those intervals when no reference signal is derived therefrom. Relay 27 serves to prevent the rear wheels from being unbraked at light application of the brake pedal. Hereby pulsating retardation can be avoided at normal braking.

Due to the fact that relay 9 can be activated only when the deceleration calculated in unit 8 is lower than a predetermined value it is possible to eliminate the risk of supplying the reference speed generator 10 with speed values which have been calculated in unit 7 during rapid changes in the speed of any of the two reference wheels.

Naturally, the invention is not restricted to the embodiment above described but includes a variety of different modifications. Thus, it is for instance possible to combine some of the units of the arrangement into larger integrated units or to replace them by units having another function and also another connection. Especially, it should be mentioned that those units which above have been referred to as relays are preferably not electromagnetic relays but consist of electronic circuits with a corresponding function. It should also be noted that it is not necessary to neutralize the braking power on the different wheels completely when the magnetic valves are activated. In some applications it may be sufficient if said valves are arranged to cause a certain reduction of the braking power on the respective wheels.

What is claimed is:

1. A brake control system for wheeled vehicles comprising, transmitters at each braked wheel of the vehicle, said transmitters generating electrical signals corresponding to the rotary speed of the respective wheel,
a reference speed generator producing a reference speed signal, said reference speed generator being actuated by the output signal from at least one of said transmitters,
said reference speed generator being controlled by means sequentially sensing the rotary speed $w_n$ and simultaneously determining the deceleration $r_n$ of one of said wheels corresponding to the transmitter supplying said reference speed generator,
means for temporarily neutralizing or reducing the braking power on said wheel so that at the sensing moment $t_n$ said wheel will rotate with a speed corresponding to the speed of a freely rotating wheel, said means for controlling said reference speed generator being arranged to sequentially update said reference speed signal to represent a reference speed $w_r = w_n - r_n(t-t_n)$,
means for comparing said signals with said reference speed signal and generating a further signal representing a slip of said wheels,
means controlled by said further signals to control the braking power on the respective wheel.

2. A brake control system according to claim 1 in which said means for deriving a reference speed signal derives said signal from two or more wheels alternately serving as a reference wheel.

3. A brake control system according to claim 1 including means for adjusting said reference speed signal at constant time intervals.

4. A brake control system according to claim 1 including means for adjusting said reference speed signal at time intervals having a length determined by the deceleration of said reference wheel.

* * * * *